United States Patent [19]

Todo et al.

[11] Patent Number: 4,834,819

[45] Date of Patent: May 30, 1989

[54] PROCESS FOR PRODUCING INFORMATION RECORDING DISCS

[75] Inventors: Akira Todo; Toshio Kimura; Masayoshi Kurisu, all of Ichihara, Japan

[73] Assignee: Mitsui Petrochemical Industries, Ltd., Tokyo, Japan

[21] Appl. No.: 230,974

[22] Filed: Aug. 11, 1988

[30] Foreign Application Priority Data

Aug. 11, 1987 [JP] Japan .................................. 62-200665

[51] Int. Cl.$^4$ .............................................. B29C 65/08
[52] U.S. Cl. ................................... 156/73.1; 156/292; 156/300; 156/580.2; 264/23; 346/135.1; 369/286
[58] Field of Search ................. 156/73.1, 580.1, 580.2, 156/292, 300; 264/23; 360/135; 369/286; 346/135.1, 137

[56] References Cited

U.S. PATENT DOCUMENTS

| 4,159,220 | 6/1979 | Bosche et al. | 156/580.2 |
| 4,499,477 | 2/1985 | Davies et al. | 346/137 |
| 4,564,932 | 1/1986 | Lange | 156/308.4 |
| 4,644,520 | 2/1987 | Lange | 369/286 |

FOREIGN PATENT DOCUMENTS

| 60-103537 | 6/1985 | Japan | 156/73.1 |
| 62-173234 | 7/1987 | Japan | 156/73.1 |

Primary Examiner—Michael Wityshyn
Attorney, Agent, or Firm—Sherman and Shalloway

[57] ABSTRACT

A process for producing information recording discs of an air sandwich structure by ultrasonic welding together two disc substrates, at least one of which has a recording medium containing layer, through outer and inner peripheral spacers lying therebetween, which process is characterized in that the ultrasonic welding is carried out by the use of a horn and an anvil which are so designed that each of said horn and said anvil has a difference in height along the axial direction between its portion corresponding to the outer peripheral spacer and its portion corresponding to the inner peripheral spacer, wherein the sum of differences in height of said horn and said anvil corresponds to the difference in thickness between the outer peripheral poritons of said two disc substrates plus the outer peripheral spacer and the inner peripheral portions of said two disc substrates plus the inner peripheral spacer.

3 Claims, 3 Drawing Sheets

PROCESS FOR PRODUCING INFORMATION RECORDING DISCS

FIELD OF THE INVENTION

This invention relates to processes for producing information recording discs of an air sandwich structure by ultrasonic welding, which information recording discs are useful, for example, as optical discs.

BACKGROUND OF THE INVENTION

There has been proposed a process for producing information recording discs of an air sandwich structure made of plastics to perform storing and reading of information by converging rays of light such as laser beam and the like on recording medium containing layers, which process comprises subjecting two disc substrates through outer and inner peripheral spacers lying therebetween to ultrasonic welding (e.g. Japanese Patent Laid-Open Publn. No. 103537/1985).

The proposed process is intended to laminate two disc substrates to each other, wherein outer and inner peripheral spacers both having projections on both surfaces thereof are laid between said two disc substrates, ultrasonic wave vibration emanated from a ultrasonic welding machine is applied through said two disc substrates to said outer and inner peripheral spacers, and the projections of said outer and inner peripheral spacers are softened, thereby fusion bonding said two spacers to said disc substrates at once, and this process has such advantages that the process is simple and rate of production is high in comparision with the adhesive lamination method.

In the prior art process as referred to above, however, the ultrasonic welding machine used therefor is so designed as to leave spaces equal in distance between the horn and anvil in the positions of the outer and inner peripheral spacers at which the ultrasonic welding is performed, while the inner and outer peripheral portions of the disc substrate are not equal in thickness but generally the inner peripheral portion of the disc substrate is thicker than the outer peripheral portion thereof and, moreover, the outer and inner peripheral spacers are not equal in thickness. On that account, there were involved such problems that when such disc substrates having interposed therebetween such outer and inner peripheral spacers are ultrasonic welded together using the horn and anvil having a uniform space in distance therebetween, warp occurs on the substrate surface and no information recording discs having an angle of warp in conformity to the standard specification (within 5 mrad according to ISO) are obtained and that the welded portions are liable to peel off.

OBJECT OF THE INVENTION

The present invention is intended to solve the above-mentioned problems, and an object of the invention is to provide a process for producing information recording discs, which process is capable of producing information recording discs comprising a laminated disc being favorable in warpage characteristics and hard to peel off even when the disc substrates as well as inner and outer peripheral spacers are not uniform in thickness.

SUMMARY OF THE INVENTION

The present invention is directed to a process for producing information recording discs of an air sandwich structure by ultrasonic welding together two disc substrates, at least one of which has a recording medium containing layer, through outer and inner peripheral spacers lying therebetween, which process is characterized in that the ultrasonic welding is carried out by the use of a horn and an anvil which are so designed that each of said horn and said anvil has a difference in height along the axial direction between its portion corresponding to the outer peripheral spacer and its portion corresponding to the inner peripheral spacer, wherein the sum of differences in height of said horn and said anvil corresponds to the difference in thickness between the outer peripheral portions of said two disc substrates plus the outer peripheral spacer and the inner peripheral portions of said two disc substrates plus the inner peripheral spacer.

Figure 1:
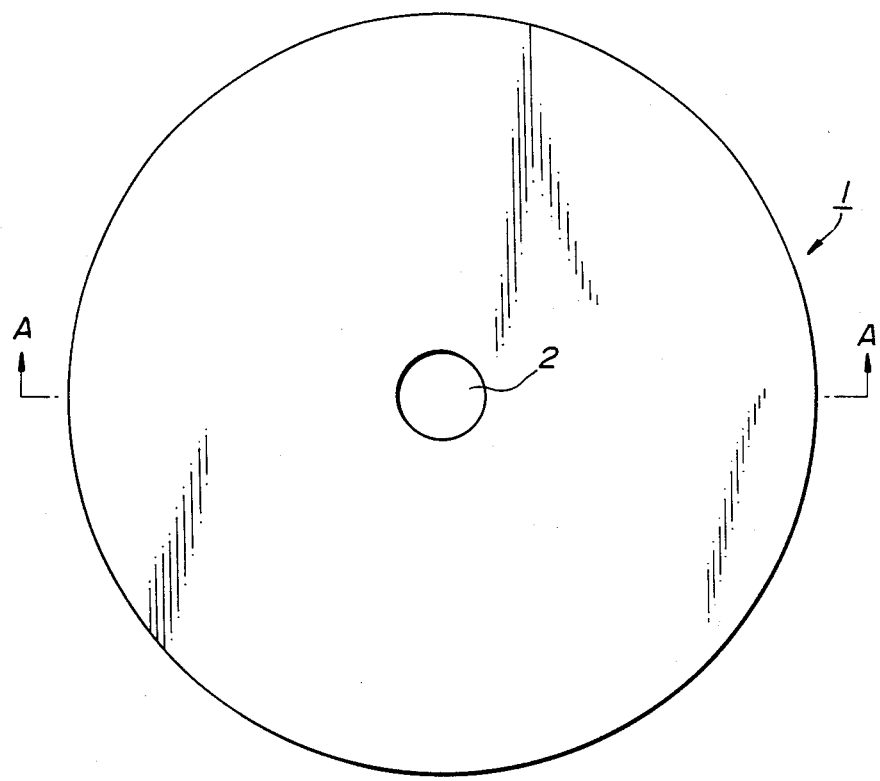
FIG. 1 is a plain view of the information recording disc of the present invention.

In the figures mentioned above, the same signs represent the same or corresponding portions, wherein 1 is an information recording disc, 3a and 3b are disc substrates, respectively, 4a and 4b are recording medium containing layers, respectively, 5 is an outer peripheral spacer, 6 is an inner peripheral spacer, 7 is a projection, 8 is a welded portion, 11 is an anvil, 14 is a horn, 11a and 14a are outer peripheral welding portions, and 11b and 14b are inner peripheral welding portions.

DETAILED DESCRIPTION OF THE INVENTION

Materials used for forming the disc substrate, outer peripheral spacer and inner peripheral spacer are thermoplastic resins such as polycarbonates, polymethyl methacrylates and polyolefins. Preferably useful resins are copolymers of ethylene and cycloolefins represented by the following general formula [I] or [II]. Preferred copolymers are those which contain 40-85 mol%, preferably 50-80 mol% of ethylene. Particularly preferred resins for forming the disc substrate include, for example, cycloolefin type random copolymer compositions formed from components:

(A) a cycloolefin type random copolymer comprising an ethylene component and a cycloolefin component derived from a cycloolefin represented by the following general formula [I] or [II], said copolymer having an intrinsic viscosity $[\eta]$ of 0.05-10 dl/g as measured in decalin at 135° C. and a softening temperature (TMA) of at least 70° C., and (B) a cycloolefin type random copolymer comprising an ethylene component and a cycloolefin component represented by the following general formula [I] or [II], said copolymer having an intrinsic viscosity $[\eta]$ of 0.01-5 dl/g as measured in decalin at 135° C. and a softening temperature (TMA) of less than 70° C., the weight ratio of said component (A)/component (B) being 100/0.1 to 100/10. Preferably, the component (A) contains 40-95 mol%, preferably 40-80 mol%, more preferably 50-75 mol% of ethylene, and the component (B) contains 60-98 mol%, preferably 60'95 mol% of ethylene.

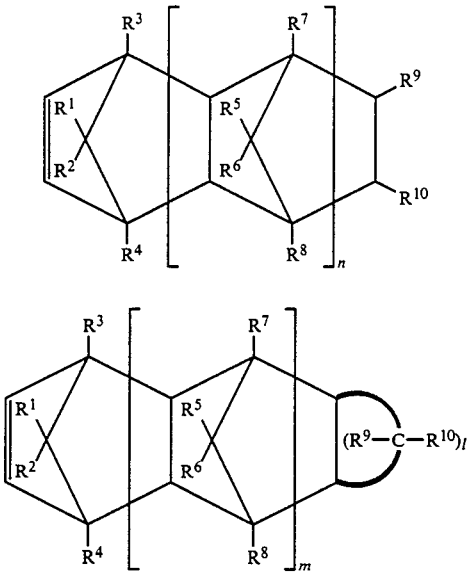

wherein n and m are each zero or a positive integer, l is an integer of 3 or more, and $R^1$ to $R^{10}$ each represent hydrogen atom, halogen atom or hydrocarbon group.

Of the resins illustrated above, those which are used for forming the disc substrates are preferably transparent. The resins used for forming the outer peripheral spacer are preferably those incorporated with 0.01-5% by weight of inorganic particles such as titanium oxide and silica having a particle diameter of less than 200 μm. The resins used for forming the inner peripheral spacer may be those which are transparent or those which have been incorporated with fillers.

The disc substrates used are those which have been molded into the form of a transparent disc. The outer peripheral spacer used is that which has been molded into the form of a ring, and the inner peripheral spacer used is that which has been molded into the form of a disc, and both spacers have projections formed on both surfaces thereof. In this case, the differences in height along the axial direction of the horn and anvil are decided on the basis of a thickness of the outer peripheral spacer including the projection thereof and of a thickness of the inner peripheral spacer including the projection thereof. The projections preferably taper off to a point, and they are desirably arranged annularly but discontinuously.

The term "information recording disc" as referred to in the present invention is intended to include all the media which record information on recording medium containing layers thereof, such as optical discs and flexible optical discs.

In the process for producing information recording discs of the present invention, two disc substrates having interposed outer and inner peripheral spacers therebetween are ultrasonic welded together by means of a horn and an anvil which are so designed that each of said horn and said anvil has a difference in height along the axial direction in its portion corresponding to the inner peripheral spacer, wherein the sum of differences in height of said horn and said anvil coincides with the difference in thickness between the outer peripheral portions of said two disc substrates plus the outer peripheral spacer and the inner peripheral portions of said two disc substrates plus the inner peripheral spacer.

In the above case, it is desirable that the information recording discs are produced by first superposing the disc substrate on one side on the outer peripheral spacer, supersonic welding them together, superposing the the disc substrate on the outer side through the inner peripheral spacer on said outer peripheral spacer-welded disc substrate turned inside out, and then laminating these two disc substrates by ultrasonic welding from one direction at once the outer peripheral spacer to the disc substrate on the other side, and the inner peripheral spacer to the disc substrates on both sides.

In the process of the present invention, because the ultrasonic welding is performed by means of a horn and anvil having the predetermined difference in height along the axial direction, said difference corresponding to the thickness of the disc substrates and inner and outer peripheral spacers, residual strain in the resulting information recording discs is lessened and delamination of the welded portions will also cease to occur, whereby the information recording discs are found to be excellent in warpage characteristics.

EFFECT OF THE INVENTION

According to the present invention, it is possible to produce information recording discs comprising a laminated disc having excellent warpage characteristics, because the process of the invention is so designed as to perform the ultrasonic welding of the disc substrates by using an anvil and a horn having the difference in height along the axial direction corresponding to the difference in thickness between the inner and outer peripheral portions of the two disc substrates plus the inner and outer peripheral spacers.

EMBODIMENT OF THE INVENTION

Figure 6:
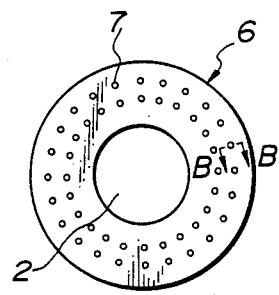
FIGS. 6 to 8 are plain views showing separate inner peripheral spacers, respectively.
Figure 7:
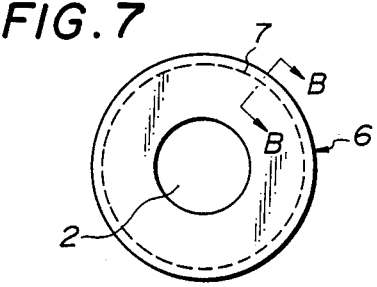
Figure 8:
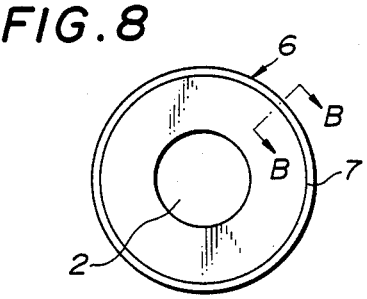
Figure 9:
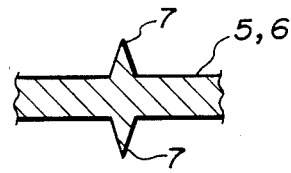
FIG. 9 is a sectional view at B—B of the spacers shown in FIGS. 3 to 8, respectively.
Figure 10:
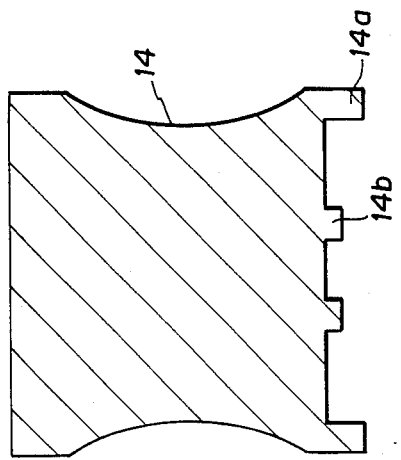
FIGS. 10 and 11 are sectional views showing the states relative to a disc substrate and outer peripheral spacer, and to disc substrates and outer and inner peripheral spacers, under which they are welded together.
Figure 11:
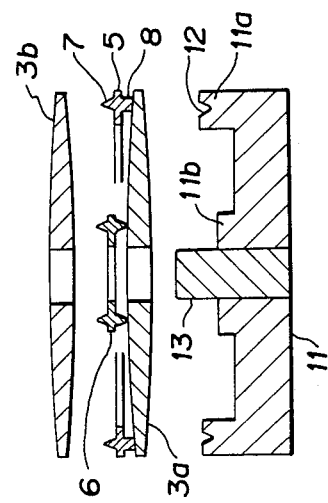

The present invention is illustrated below with reference to examples as expressed in terms of figures shown in the accompanying drawings. FIG. 1 is a plain view of the information recording disc as produced, FIG. 2 is a sectional view at A—A of the disc shown in FIG. 1, FIGS. 3 to 5 are plain views showing separate outer peripheral spacers, respectively, FIGS. 6 to 8 are plain views of separate inner peripheral spacers, respectively, FIG. 9 is a sectional view at B—B of the spacers shown in FIGS. 3 to 8, respectively, FIGS. 10 and 11 are sectional views respectively showing the states relative to a disc substrate and outer peripheral spacer, and to disc substrates and outer and inner peripheral spacers, at which they are welded together.

Figure 2:
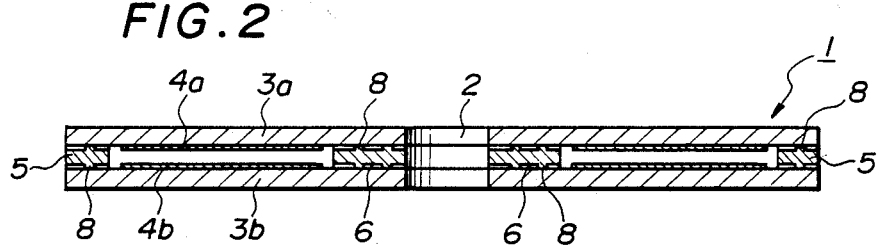
FIG. 2 is a sectional view at A—A of the disc shown in FIG. 1.

First, in FIGS. 1 and 2, 1 is an information recording disc comprising a laminated circular disc of an air sandwich structure having a center hole 2 in the center thereof. In the disc 1, two disc substrates 3a and 3b are laminated together through an outer peripheral spacer 5 and an inner perpiheral spacer 6 so that recording medium containing layers 4a and 4b of said two disc substrates 3a and 3b face to each other, said two disc substrates being welded together by ultrasonic welding at the projections 7 provided on both surfaces of said outer and inner peripheral spacers 5 and 6, respectively, and being fusion bonded to each other by means of welded portions 8 formed by transformation of said projections 7.

The outer peripheral spacer 5 is molded into the form of ring and provided with tapering projections 7 on both surfaces and in the same position thereof. The projections 7 are arranged annularly but discontinuously, and in FIG. 3 they are formed into short arcs arranged in the form of circular broken line, in FIG. 4 they are molded into long arcs arranged in the form of circle but divided into four portions along the circumference, and in FIG. 5 they are molded into the form of perfectly continuous circle.

The inner spacer 6 is molded into the form of disc having a center hole 2 at the center thereof and provided with tapering projections 7 on both surfaces and in the same position thereof. The projections 7 are arranged annularly but discontinuously, and in FIG. 6 they are molded into the form of a cone and arranged in the form of radial dots in two rows, in FIG. 7 they are formed into short arcs arranged in the form of a circular broken line, and in FIG. 8 they are molded into the form of a perfectly continuous circle.

In FIGS. 10 and 11, 11 is an anvil (a setting table) of a ultrasonic welding machine (not shown), wherein a distance ΔA between an outer peripheral welding part 11a and an inner peripheral welding part 11b is provided. A positioning groove 12 is formed annularly and continuously on the surface of the outer peripheral welding part 11a, and a positioning chuck 13 is provided inside the inner peripheral welding part 11b. A horn 14 connected to a ultrasonic wave oscillator (not shown) is held right above the anvil 11, wherein the outer peripheral welding part 14a and an inner peripheral welding part 14b are formed likewise on the lower part thereof directly opposite to the anvil 11, and they have a distance ΔH.

The disc substrates 3a and 3b are each thicker in their inner peripheral portion than in their outer peripheral portion, and when said disc substrates are placed upon through the outer peripheral spacer 5 and the inner peripheral spacer 6, a difference in thickness between the outer and inner peripheral portions of the disc substrates becomes almost equal to the sum of the distance ΔA and ΔH.

In the process for producing the information recording disc 1, as shown in FIG. 10, the outer peripheral spacer 5 is first set on an anvil 11 by positioning said spacer 5 while inserting the projection 7 of spacer 5 into a positioning groove 12 of the anvil 11 of the ultrasonic welding machine. The disc substrate 3a is then superposed on the spacer 5 thus set, positioned and held on the anvil 11 by inserting the positioning chuck 13 into the center hole 2 in the center of the anvil 11. The positioning chuck 13 is divided into three portions which are designed to open in the radial direction and to position and chuck the disc substrate 3a.

In the state mentioned above, the horn 14 connected to the ultrasonic wave oscillator is allowed to descend onto the disc substrate 3a by means of a fluid pressure cylinder (not shown) and transmit ultrasonic wave vibration to the disc substrate 3a under pressure, whereupon the projection 7 of the upper side of the outer peripheral spacer 5 and the corresponding portion of the outer peripheral spacer 5 are softened to fusion bond said spacer 5 to said disc substrate 3a, whereby welded portions 8 are formed as shown in FIGS. 2 and 11.

Subsequently, as shown in FIG. 11, the outer peripheral spacer 5-welded disc substrate 3a is turned inside out, and the disc substrate 3b on the other side is set on the anvil 11 by superposing it through the inner peripheral spacer 6 on said disc substrate 3a. The disc substrates 3a, 3b and the inner peripheral spacer 6 are then positioned and held on the anvil 11 by inserting the positioning chuck 13 into the center hole 2. The horn 14 is again allowed to descend onto the disc substrate 3b and transmit ultrasonic wave vibration thereto under pressure thereto, whereby unwelded projection 7 of the outer peripheral spacer 5 and the corresponding portion of the disc substrate 3b, and the projections 7 or both surfaces of the inner peripheral spacer 6 and the corresponding portions of both the disc substrates 3a and 3b are softened and weld together at once to form the welded portions 8 as shown in FIG. 2, thus the information recording disc 1 is produced.

In the process as illustrated above, residual strain in the resulting laminated disc is lessened and accordingly the information recording disc 1 obtained is excellent in warpage characteristics and also no delamination occur in the resultant laminated disc, because the anvil 11 and the horn 14 are provided with the distance ΔA and ΔH, respectively, and as the result, the difference in height between the outer peripheral welding parts 11a and 14a and the inner peripheral welding parts 11b and 14b coincides with the difference in thickness between the outer peripheral portion and inner peripheral portion of the disc substrates 3a and 3b when they are placed one upon another through the outer peripheral spacer 5 and inner peripheral spacer 6 interposed therebetween. Furthermore, because other unwelded portions of the disc substrates and outer and inner peripheral spacers are welded together at once in the second stage of the process in such a state where the outer peripheral spacer has been welded to the disc substrate 3a on once hand in the first stage, residual strain in the resulting laminated disc is lessened, whereby the information recording disc 1 obtained is further improved in warpage characteristics.

The present invention is further illustrated below with reference to test examples and test comparative examples.

Figure 3:
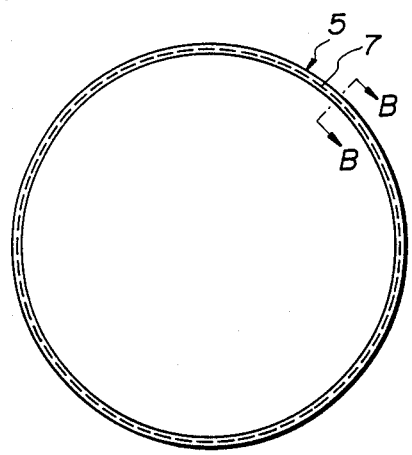
FIGS. 3 to 5 are plain views showing separate inner peripheral spacers, respectively.
Figure 4:
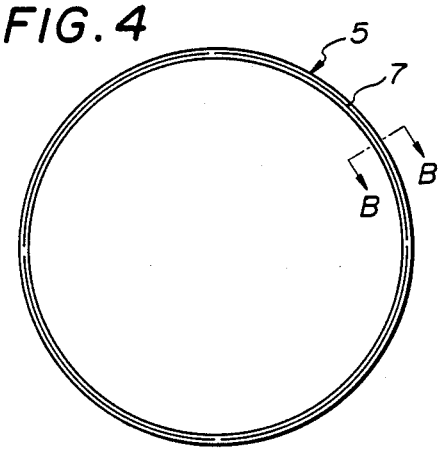
Figure 5:
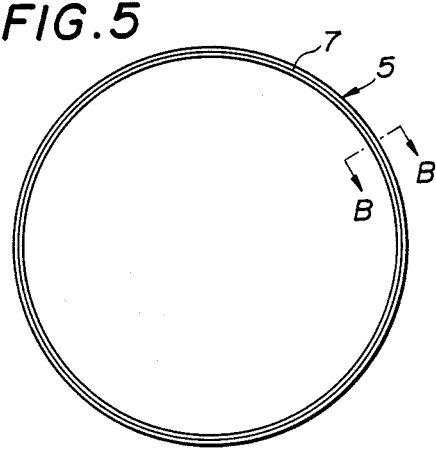

The information recording discs 1 were produced according to the above-mentioned process, by ultrasonic welding of the disc substrates 3a and 3b, 130 mm in diameter and 1.18 mm in thickness of the outer peripheral portion, and 1.23 mm in thickness of the inner peripheral portion) molded from an ethylene/tetracyclododecene copolymer (the ethylene content 62 mol%), the outer peripheral spacers shown in FIGS. 3, 130 mm in outer diameter, 125 mm in inner diameter, and about 0.77 mm in thickness molded from a resin composition comprising an ethylene/tetracyclododecene copolymer (the ethylene content 72 mol%) incorporated with 0.3% by weight of titanium oxide, and the inner peripheral spacers shown in FIGS. 5, 36 mm in outer diameter, 15 mm in inner diameter, and about 0.76 mm in thickness molded from an ethylene/tetracyclododecene copolymer (the ethylene content 72 mol%) by the use of the anvil 11 and horn 14, the distance ΔA and ΔH of which have been varied as shown in Table 1. The information recording discs 1 thus produced were measured for the amount of warp (the maximum value of warp angle of the disc substrate 3a + the maximum value of warp angle of the disc substrate 3b)/2, and they were dropped from the height of 1 m and thereafter the state of the welded portions was visually evaluated. The results obtained are shown in Table 1.

In Table 1, the amount of warp (W) measured was expressed in terms of the following indices of evaluation. In this connection, the information recording discs which can be put to practical use without marring their performance are those having the evaluation indices F and G.

A: $W > 10$ m radian
B: $10 \geq W > 8.75$ m radian
C: $8.75 \geq W > 7.5$ m radian
D: $7.5 \geq W > 6.25$ m radian
E: $6.25 \geq W > 5$ m radian
F: $5 \geq W > 3.75$ m radian
G: $W \leq 3.75$ m radian Comparative Examples 1 and 2 were carried out in the same manner as in the above-mentioned examples provided that the distance $\Delta A$ and $\Delta H$ in Comparative Example 1 were both zero, and those in Comparative Example 2 were both excessively large. The results obtained are shown in Table 1.

TABLE 1

| | Examples and Comparative Examples | | | | | | |
|---|---|---|---|---|---|---|---|
| | Example 1 | Example 2 | Example 3 | Example 4 | Example 5 | Compar. Ex. 1 | Compar. Ex. 2 |
| Difference in height | | | | | | | |
| Horn $\Delta H(\mu m)$ | 95 | 80 | 60 | 50 | 20 | 0 | 150 |
| Anvil $\Delta A(\mu m)$ | 6 | 6 | 60 | 40 | 70 | 0 | 150 |
| $\Delta H + \Delta A(\mu m)$ | 101 | 86 | 120 | 90 | 90 | 0 | 300 |
| Amount of Warp | G | F | G | F | F | B | D |
| Drop test | No delamination is observed | No delamination is observed | No delamination is observed | No delamination is observed | No delamination is observed | Outer peripheral spacer delaminated | Inner peripheral spacer delaminated |

From the results shown in Table 1, it is understood that in the process of the present examples where the ultrasonic welding was performed by using the anvil and horn having the difference in height corresponding to the difference in thickness between the outer and inner peripheral positions of the disc substrate plus inner and outer peripheral spacers, the information recording discs obtained are all excellent in warpage characteristics and are not subject to delamination when the drop test thereof is conducted, whereas in the processes of the comparative examples where the anvil and horn used have no difference in height, or have an excessively large difference in height, the information recording discs obtained have large amounts of warp and are subject to delamination when the drop test thereof is conducted.

What is claimed is:

1. A process for producing information recording discs of an air sandwich structure by ultrasonic welding together two disc substrates, at least one of which has a recording medium containing layer, through outer and inner peripheral spacers lying therebetween, which process is characterized in that the ultrasonic welding is carried out by the use of a horn and an anvil which are so designed that each of said horn and said anvil has a difference in height along the axial direction between its portion corresponding to the outer peripheral spacer and its portion corresponding to the inner peripheral spacer, wherein the sum of said differences in height of said horn and said anvil corresponds to the difference in thickness between the outer peripheral portions of said two disc substrates plus the outer peripheral spacer and the inner peripheral portions of said two disc substrates plus the inner peripheral spacer.

2. The process as claimed in claim 1 wherein the outer and inner peripheral spacers both have projections on both surfaces thereof.

3. The process as claimed in claim 2 wherein the projections are arranged annularly but discontinuously.

* * * * *